United States Patent [19]
Bradley et al.

[11] 3,925,209
[45] Dec. 9, 1975

[54] STRAINER VALVES

[75] Inventors: Robert C. Bradley, Paramus, N.J.;
Garland L. Fulton, Wayne, Pa.

[73] Assignee: Multi-Metal Wire Cloth Inc.,
Tappan, N.Y.

[22] Filed: Aug. 28, 1974

[21] Appl. No.: 501,290

[52] U.S. Cl. .............................. 210/304; 210/411
[51] Int. Cl.² ........................................ B01D 29/38
[58] Field of Search ............ 210/97, 108, 131, 209,
210/282, 304, 311, 350, 351, 359, 391–393,
395, 411, 412, 426

[56] References Cited
UNITED STATES PATENTS

| | | | |
|---|---|---|---|
| 191,131 | 5/1877 | Gainey | 210/411 X |
| 256,853 | 4/1882 | Pitt | 210/350 X |
| 1,340,599 | 5/1920 | Clarke | 210/311 |
| 3,169,112 | 2/1965 | Nelson | 210/282 X |
| 3,530,993 | 9/1970 | Fulton | 210/304 X |

OTHER PUBLICATIONS
Perry's Chemical Eng. Handbook, 4th Ed., Perry et al., 1963, pp. 22-78 to 22-80.

*Primary Examiner*—Charles N. Hart
*Assistant Examiner*—Robert H. Spitzer
*Attorney, Agent, or Firm*—Zachary T. Wobensmith, 2nd; Zachary T. Wobensmith, III

[57] ABSTRACT

A strainer valve is disclosed having a housing with a pair of end sections and an inserted central section of selected length, the sections preferably being clamped together, the housing having a process fluid supply connection, a clean fluid delivery connection, a backwash fluid supply connection and a backwash discharge connection. The housing has therein a movable piston with a central strainer of selected length and heads which function as control valves. The piston is movable from a fluid particle separating or straining position to a position for back flushing in the opposite direction through the strainer. Fluid supply connections are provided to the housing for positioning of the piston. Flushing may be by backwash fluid, the process fluid or by an auxiliary fluid.

11 Claims, 4 Drawing Figures

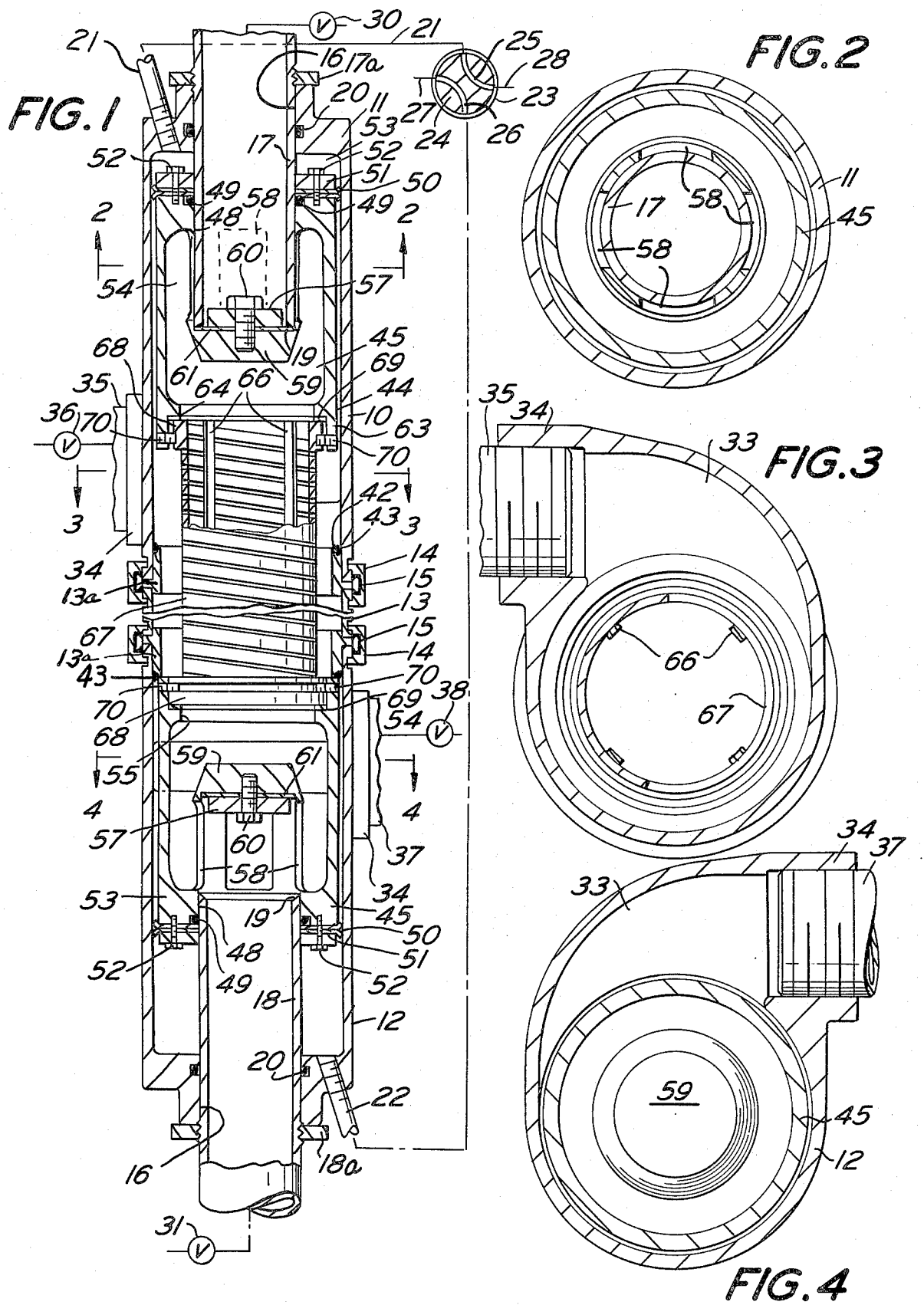

3,925,209

STRAINER VALVES

BACKGROUND OF THE INVENTION

1. Field of the Invention

This invention relates to strainer valves and more particularly to a strainer valve which in one position effects a fluid straining action and in another position the strainer element is back flushed for cleaning.

2. Description of the Prior Art

It has heretofore been proposed to provide strainers with back flushing for cleaning such as in the patents to Collin, U.S. Pat. No. 1,438,983, and English, Pat. No. 1,914,012 and Maunula, U.S. Pat. No. 2,532,177, but in these the filter is at a fixed location.

It has also been proposed to move the screens for the purpose of backwashing as in the patents to Clarke, U.S. Pat. No. 1,340,599, and Wardle, U.S. Pat. No. 2,007,780, and Fulton U.S. Pat. No. 3,530,993.

The prior devices have problems in connection with the valving, are complicated and are expensive to construct and are not adapted to selective change in strainer area.

In certain of the prior devices also, port crossing occurred with short life of packing elements moving across the ports.

SUMMARY OF THE INVENTION

In accordance with the invention, a strainer valve is provided which includes a housing with a piston carried strainer slidably mounted in the housing for positioning by control pressure, the piston having sealing surfaces at its ends for controlling the process fluid inlet and delivery and the backwash fluid inlet and discharge. In one position of the piston a straining action is effected while in another position back flushing of the strainer for cleaning is effected. The cleaning may be effected by a backwash fluid, or by a clean process fluid.

It is the principal object of the present invention to provide a straining device which combines the features of an efficient straining medium with a valving system for back flushing the strainer for cleaning.

It is a further object of the present invention to provide a straining device of the character aforesaid in which the strainer is linearly moved by fluid pressure.

It is a further object of the present invention to provide a straining device in which the strainer may have any desired particle separation over a wide size range, but with efficient cleaning of the strainer when desired.

It is a further object of the invention to provide a straining device in which pairs of components are employed with central inserts of lengths selected to give the desired capacity.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which:

FIG. 1 is a vertical central sectional view of a strainer valve in accordance with the invention, and in the position for particle separation by the strainer;

FIG. 2 is a transverse sectional view taken approximately on the line 2—2 of FIG. 1;

FIG. 3 is a transverse sectional view taken approximately on the line 3—3 of FIG. 1; and FIG. 4 is a transverse sectional view taken approximately on the line 4—4 of FIG. 1;

It should, of course, be understood that the description and drawings herein are illustrative merely, and that various modifications and changes can be made in the structure disclosed without departing from the spirit of the invention.

DESCRIPTION OF A PREFERRED EMBODIMENT

Referring now more particularly to the drawings the strainer valve there shown includes a housing 10 with upper and lower housing end sections 11 and 12, of similar size, shape and construction and may also have an interposed central housing section 13, preferably held in assembled relation by clamps 14 having interiorly disposed sealing gaskets 15, for preventing fluid leakage. The use of the central housing section 13 and the length or lengths of such section 13 will be determined by the capacity of the strainer in a specific embodiment. Various predetermined lengths of housing sections 13, as will hereinafter appear, will permit of selection of various ranges of capacity with consequent saving in manufacturing costs. The housing sections 13 have inserts 13a.

Each of the housing end sections 11 and 12 has an end opening 16 for the reception of pipes 17 and 18 which extend interiorly of the housing 10 and have beveled ends 19 to provide a valve surface. Lock nuts 17a and 18a in threaded engagement on the pipes 17 and 18 permit of holding the pipes 17 and 18 in the desired longitudinally adjusted positions. A suitable packing 20 can be provided for preventing fluid leakage.

Each of the housing end sections 11 and 12 respectively has a fluid connection 21 and 22 for supply and exhaust of fluid, such as air under pressure.

The fluid connections 21 and 22 are connected to a control valve 23 with a valve plug 24 having ports 25 and 26 for controlling the delivery of fluid under pressure through pipe 27 from a suitable source (not shown) or discharge to atmosphere through pipe 28.

The pipe 17 is preferably connected through a suitable valve 30 to a source of fluid, preferably liquid, for backwashing, as hereinafter explained.

The pipe 18 is preferably connected through a suitable valve 31 for delivery of the clean process fluid, as hereinafter explained.

Each of the housing end sections 11 and 12 has a tangentially disposed fluid passageway 33 extending to a collar 34. The passageway 33 in the housing end section 11 has a pipe 35 connected thereto and controlled by a valve 36 preferably for the supply of the process fluid to be strained. The passageway 33 in the housing end section 12 has a pipe 37 connected thereto and controlled by a valve 38 for the discharge of the backwash fluid. The valves 30, 31, 36 and 38 permit removal of the strainer, if desired.

The central housing section 13 has machined grooves 40 and the end sections 11 and 12 have similar grooves 40a for retention in alignment by clamps 14, and which also hold the inserts 13a in position.

The inserts 13a have transversely extending end walls 42 and are provided with packings 43 in engagement therewith which serve as abutments or stops and as seals and with the contiguous inner faces of the housing end sections 11 and 12 to prevent fluid leakage from the interior.

Within the housing 10 a longitudinally axially movable piston 44 is provided which includes generally cylindrical piston heads 45, of similar size, shape and construction, with a strainer 46 interposed therebetween.

The piston heads 45 have central bores 48 for slidable movement on the pipes 17 and 18, have packings 49 for preventing fluid leakage along with pipes 17 and 18 and have cup packings 50 held in place by packing retainer plates 51 and bolts 52 extending through the plates 51 and packings 50 and into the transverse wall portions 53 of the piston heads 45.

The piston heads 45, interiorly of the transverse wall portions 53, have hollow interior portions 54 with bores 55 and cylindrical sleeves 56 closed at their ends by integral seat retainers 57 and with side openings 58 for fluid flow.

The seat retainers 57 have packing holders 59 secured thereto by bolts 60. The packing holders 59 carry packings 61 for engagement by the beveled ends 19 to shut off flow respectively at these locations.

The adjustability of the pipes 17 and 18 and their retention by the lock nuts 17a and 18a permits of setting for engagement of a beveled end 19 with a packing 61 at one end when the head 45 at the other end is engaged with its packing 43 and vice versa.

The piston heads 54 contiguous to the bores 55 have end rims 63 with transverse shoulders 64.

The strainer 46, which is preferably cylindrical in shape, is of any desired porous or foraminous construction as determined by the sizes of the particles to be separated from the process fluid.

In the particular embodiment of strainer 46 which is illustrated it consists of a plurality of longitudinal supporting strips 66 with a helical band 67 secured thereto, the spacing between the turns of the band 67 determining the size of particles to be separated. In a specific embodiment the distance between the turns can be 0.002 inch.

The strainer 46 has secured thereto at its ends mounting rings 68 which seat on washers 69 on the shoulders 64 and are retained in place by set screws 70. The strainers can be readily replaced if desired, to accommodate different particle sizes.

The strainer 46 with its end mounting rings 68 can be of a length to be determined by the capacity of the strainer in a specific embodiment and with the length of the central section 13 correlated thereto. Various predetermined correlated lengths of central sections and of strainers thus permits of the selection and/or field modification for various ranges of capacity with consequent saving in manufacturing costs and costs to the user.

The mode of operation will now be pointed out.

In use for straining process fluid for the removal of particles carried in the process fluid the piston 44 is moved to its upper position as shown in FIG. 1 by application of pressure fluid of predominant pressure on the lower head 45 through the fluid connection 22 with the fluid connection 21 connected to atmosphere.

Flow of backwash fluid through the pipe 17 is cut off by engagement of the washer 61 of the upper piston head 45 with the beveled end 19 of pipe 17.

Flow of fluid to the backwash discharge pipe 37 is prevented, the position of the piston with the rim 63 of the lower piston head 45 engaged with the packing 43 and preventing access to the lower passageway 33 and pipe 37 and the packing 50 being effective for preventing fluid access from below.

Process fluid is delivered through the pipe 35 and upper passageway 33 to the interior space outside the strainer 46 with a whirling or rotary motion imparted by the tangential entry so that the pressure drop is reduced and in the straining mode continuous cleaning occurs. The process fluid passing through the strainer has the particles exteriorly restrained and within the interior of the strainer 46 moves downwardly into the lower space 54, passes through the side openings 58 and is discharged through the pipe 18.

If it is desired to clean the strainer 46, as by backwashing, the piston 44 is moved downwardly by application of fluid pressure through the fluid connection 21 on the upper end of the piston 44. The piston is moved downwardly to close the pipe 18 by engagement of the washer 61 of the lower piston head with the end 19 of the pipe 18 and with the upper head 45 in engagement with the lower packing 43, fluid delivery through the pipe 35 being cut off. At the same time backwash fluid from the pipe 17 is permitted to enter the upper space 54 and the interior of the strainer 46, pass outwardly therethrough and be discharged through the lower passageway 33 and the backwash discharge pipe 37 taking with it previously collected particles.

Upon completion of the backwashing the piston 44 can be returned to its original position for resumption of straining of the process fluid, discharge through the pipe 37 being cut off.

It will thus be seen that apparatus has been provided with which the objects of the invention are attained.

We claim:

1. Strainer apparatus comprising
    a housing having opposite fluid inlet and outlet connections at its ends and side fluid inlet and outlet connections,
    one of said fluid inlet connections being for process fluid to be strained and one of said fluid inlet connections being for a strainer cleaning fluid,
    one of said fluid outlet connections being for strained process fluid and the other of said fluid outlet connections being for discharge of strainer cleaning fluid,
    a piston slidably mounted in said housing,
    means for controlling the positioning of said piston in said housing comprising
    fluid pressure connections to the ends of said housing,
    said piston comprising a pair of piston heads with transverse portions against which the fluid pressure at said fluid pressure connections is effective,
    said piston heads having
        a hollow strainer member interposed therebetween and movable therewith, and
        fluid flow control members therein for respectively controlling one of said fluid inlet connections and one of said fluid outlet connections,
    said piston having portions in one position connecting the process fluid inlet connection through said strainer in one direction with the strained process fluid outlet connection and in another position connecting the cleaning fluid inlet connection through said strainer in the opposite direction with the cleaning fluid outlet connection,
    said housing being composed of like end sections one with both said fluid inlet connections and the other with both said fluid outlet connections,
    said housing having an intermediate section interposed between said housing end sections and to which said housing end sections are detachably connected, said intermediate section having sealing portions limiting movement of said piston within said housing.

2. Strainer apparatus as defined in claim 1 in which said piston has spaced packing members thereon, and said packing members cut off communication between one of said side connections and said screen in one position of said piston.

3. Strainer apparatus as defined in claim 2 in which said housing has continuous surface portions along which said sealing members are movable whereby said sealing members are fully supported in the respective positions of said piston member.

4. Strainer apparatus comprising a housing having opposite fluid inlet and outlet connections at its ends and side fluid inlet and outlet connections, one of said fluid inlet connections being for process fluid to be strained and one of said fluid inlet connections being for a strainer cleaning fluid, one of said fluid outlet connections being for strained process fluid and the other of said fluid outlet connections being for discharge of strainer cleaning fluid, a piston slidably mounted in said housing, means for controlling the positioning of said piston in said housing comprising fluid pressure connections to the ends of said housing, said piston comprising a pair of piston heads with transverse portions against which the fluid pressure at said fluid pressure connections is effective, said piston heads having a hollow strainer member interposed therebetween and movable therewith, and fluid flow control members therein for respectively controlling one of said fluid inlet connections and one of said fluid outlet connections, said piston having portions in one position connecting the process fluid inlet connection through said strainer in one direction with the strained process fluid outlet connection and in another position connecting the cleaning fluid inlet connection through said strainer in the opposite direction with the cleaning fluid outlet connection, one of said fluid connections having a terminal portion centrally longitudinally axially disposed within one end of said housing and with respect to which one of said piston heads is longitudinally axially movable.

5. Strainer apparatus as defined in claim 4 in which said housing has opposite end sections in which said fluid inlet and outlet connections are disposed, and each of said end sections has an end fluid connection and a side fluid connection with a tangential passageway communicating with the interior of said housing.

6. Strainer apparatus as defined in claim 4 in which said housing has opposite end sections in which said fluid inlet and outlet connections are disposed, and each of said end sections has a fluid connection with a tangential passageway and another fluid connection with an axial passageway both communicating with the interior of said housing.

7. Strainer apparatus as defined in claim 4 in which said one of said piston heads is mounted on said terminal portion for movement thereon.

8. Strainer apparatus as defined in claim 7 in which another of said fluid connections has a terminal portion centrally longitudinally axially disposed at the other end of said housing and on which the other of said piston heads is longitudinally axially movable.

9. Strainer apparatus as defined in claim 8 in which both said piston heads have portions respectively engageable with said terminal portions for controlling fluid flow with respect to said piston heads.

10. Strainer apparatus as defined in claim 4 in which said piston head has a portion engageable with said terminal portion for controlling fluid flow with respect to said piston head.

11. Strainer apparatus as defined in claim 4 in which members are provided for detachably connecting said strainer member to said piston heads.

* * * * *